(12) United States Patent
Nishimoto

(10) Patent No.: US 9,186,652 B2
(45) Date of Patent: Nov. 17, 2015

(54) PROCESS FOR PRODUCING SUPPORTED RUTHENIUM ON SILICA MODIFIED TITANIA AND PROCESS FOR PRODUCING CHLORINE

(71) Applicant: SUMITOMO CHEMICAL COMPANY, LIMITED, Tokyo (JP)

(72) Inventor: Junichi Nishimoto, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/358,427

(22) PCT Filed: Dec. 5, 2012

(86) PCT No.: PCT/JP2012/082115
§ 371 (c)(1),
(2) Date: May 15, 2014

(87) PCT Pub. No.: WO2013/085064
PCT Pub. Date: Jun. 13, 2013

(65) Prior Publication Data
US 2014/0335012 A1    Nov. 13, 2014

(30) Foreign Application Priority Data

Dec. 7, 2011   (JP) ................................ 2011-267593
Apr. 19, 2012  (JP) ................................ 2012-095373

(51) Int. Cl.
| B01J 23/00 | (2006.01) |
| B01J 23/46 | (2006.01) |
| B01J 37/02 | (2006.01) |
| B01J 37/08 | (2006.01) |
| B01J 37/10 | (2006.01) |
| B01J 21/06 | (2006.01) |
| B01J 35/10 | (2006.01) |
| B01J 37/00 | (2006.01) |
| C01B 7/04  | (2006.01) |

(52) U.S. Cl.
CPC ............... *B01J 23/462* (2013.01); *B01J 21/06* (2013.01); *B01J 21/063* (2013.01); *B01J 35/1014* (2013.01); *B01J 35/1019* (2013.01); *B01J 37/0009* (2013.01); *B01J 37/0205* (2013.01); *B01J 37/0207* (2013.01); *B01J 37/0217* (2013.01); *B01J 37/0244* (2013.01); *B01J 37/082* (2013.01); *B01J 37/10* (2013.01); *C01B 7/04* (2013.01)

(58) Field of Classification Search
CPC ....... C01B 7/04; B01J 21/063; B01J 35/1014; B01J 37/0009; B01J 37/0244; B01J 37/0207; B01J 37/0217; B01J 21/06; B01J 37/082; B01J 35/1019; B01J 37/0205; B01J 37/10
USPC ................... 502/325, 242; 423/502
See application file for complete search history.

(56) References Cited

U.S. PATENT DOCUMENTS

| 2002/0028173 A1 | 3/2002 | Hibi et al. |
| 2005/0031529 A1 | 2/2005 | Hibi et al. |
| 2010/0068126 A1 | 3/2010 | Seki |

FOREIGN PATENT DOCUMENTS

| CN | 101541423 A | 9/2009 |
| EP | 2 098 290 A1 | 9/2009 |
| EP | 2 366 661 A1 | 9/2011 |
| JP | 2000-229239 A | 8/2000 |
| JP | 2000-254502 A | 9/2000 |
| JP | 2000-281314 A | 10/2000 |
| JP | 2002-79093 A | 3/2002 |
| JP | 2002-292279 A | 10/2002 |
| JP | 2004-74073 A | 3/2004 |
| JP | 2004-276012 A | 10/2004 |
| JP | 2008-155199 A | 7/2006 |
| WO | WO 01/10550 A1 | 2/2001 |

OTHER PUBLICATIONS

International Preliminary Report on Patentability and Written Opinion of the International Searching Authority (Forms PCT/IB/373 and PCT/ISA/237), dated Jun. 10, 2014 for International Application No. PCT/JP2012/082115.
Shakhashiri, "Gases of the Air," Chemical of the Week, Chemistry 103-1, Nov. 2007, 2 pages.
The First Office Action (including an English translation), dated Mar. 30, 2015, issued in the corresponding Chinese Patent Application No. 201280059736.5.
The Issuance of the Report on the State of the Art (including an English translation), dated Jan. 22, 2015, issued in the corresponding Spanish Patent Application No. 201490059.

*Primary Examiner* — Colleen Dunn
*Assistant Examiner* — Haytham Soliman
(74) *Attorney, Agent, or Firm* — Birch, Stewart, Kolasch & Birch, LLP

(57) ABSTRACT

An object of the invention is to provide a process for producing a supported ruthenium oxide in which silica can be efficiently supported on a titania carrier and a supported ruthenium oxide superior in thermal stability and catalyst lifetime is obtained. Another object of the present invention is to provide a process for stably producing chlorine for a longer time, by using the supported ruthenium oxide obtained by the above-described process. The invention relates to a process for producing a supported ruthenium oxide in which ruthenium oxide and silica are supported on a titania carrier, wherein a titania carrier is brought into contact with an alkoxysilane compound, followed by being dried under a stream of a water vapor-containing gas, then is subjected to a first calcination under an atmosphere of an oxidizing gas, followed by being brought into contact with a ruthenium compound, and then is subjected to a second calcination under an atmosphere of an oxidizing gas. Chlorine is produced by oxidizing hydrogen chloride with oxygen in the presence of the supported ruthenium oxide thus produced, as a catalyst.

9 Claims, No Drawings

PROCESS FOR PRODUCING SUPPORTED RUTHENIUM ON SILICA MODIFIED TITANIA AND PROCESS FOR PRODUCING CHLORINE

This application claims priority to and the benefit of Japanese Patent Application Nos. 2011-267593 (filed on Dec. 7, 2011) and 2012-095373 (filed on Apr. 19, 2012), and the entire contents of which are incorporated herein by reference.

TECHNICAL FIELD

The present invention relates to a process for producing a supported ruthenium oxide in which ruthenium oxide is supported on a carrier. The present invention also pertains to a process for producing chlorine by oxidizing hydrogen chloride with oxygen by using, as a catalyst, the supported ruthenium oxide produced by the above-described process.

BACKGROUND ART

It is known that a supported ruthenium oxide is useful as a catalyst for use in production of chlorine by oxidizing hydrogen chloride with oxygen (see Patent Documents 1-5). As this supported ruthenium oxide, a supported ruthenium oxide in which ruthenium oxide and silica are supported on a titania carrier is known, and for its production process, for example, Patent Documents 6 and 7 disclose a process in which a titania carrier is brought into contact with a ruthenium compound, followed by being calcined, then is brought into contact with an alkoxysilane compound, followed by being dried in air, and then is calcined in air; and Patent Document 8 discloses a process in which a titania carrier is brought into contact with an alkoxysilane compound, followed by being dried in air, then is calcined in air, followed by being brought into contact with a ruthenium compound, and is calcined in air.

CITATION LIST

Patent Document

Patent Document 1: JP2000-229239 A
Patent Document 2: JP2000-254502 A
Patent Document 3: JP2000-281314 A
Patent Document 4: JP2002-79093 A
Patent Document 5: JP2004-276012 A
Patent Document 6: JP2002-292279 A
Patent Document 7: JP2004-074073 A
Patent Document 8: JP2008-155199 A

SUMMARY OF THE INVENTION

However, in the above-mentioned conventional production process, it was difficult to ensure a satisfactory amount of supported silica compared to an amount of an alkoxysilane compound used, and thus, it might not necessarily be satisfactory in respect of thermal stability and catalyst lifetime of the resultant supported ruthenium oxide. An object of the present invention is to provide a process for producing a supported ruthenium oxide in which ruthenium oxide and silica are supported on a titania carrier, whereby silica can be efficiently supported on a titania carrier and a supported ruthenium oxide superior in thermal stability and catalyst lifetime is obtained. Another object of the present invention is to provide a process for stably producing chlorine for a longer time, by using the supported ruthenium oxide obtained by the above-described process.

The present inventors have made extensive studies in order to attain the above-described objects, resulting in completion of the present invention.

That is, the present invention includes the following embodiments.

[1] A process for producing a supported ruthenium oxide in which ruthenium oxide and silica are supported on a titania carrier, wherein a titania carrier is brought into contact with an alkoxysilane compound, followed by being dried under a stream of a water vapor-containing gas, then is subjected to a first calcination under an atmosphere of an oxidizing gas, followed by being brought into contact with a ruthenium compound, and then is subjected to a second calcination under an atmosphere of an oxidizing gas.

[2] The process of [1], wherein the water vapor concentration in the water vapor-containing gas is 0.5 to 10% by volume.

[3] The process of [1] or [2], wherein, in the drying, space velocity of the water vapor-containing gas for the titania carrier is 10-2000/h in the standard state.

[4] The process of any one of [1] to [3], wherein a ratio of rutile type titania in the titania carrier to total of the rutile type titania and anatase type titania is 500 or more, when measured by the X-ray diffraction method.

[5] The process of any one of [1] to [4], wherein the alkoxysilane compound is a tetraalkoxysilane.

[6] The process of [5], wherein the tetraalkoxysilane is tetraethoxysilane.

[7] A process for producing chlorine, characterized in that hydrogen chloride is oxidized with oxygen in the presence of a supported ruthenium oxide produced by the process defined in any one of [1] to [6].

According to the process of the present invention for producing a supported ruthenium oxide in which ruthenium oxide and silica are supported on a titania carrier, silica can be efficiently supported on a titania carrier and a supported ruthenium oxide superior in thermal stability and catalyst lifetime is obtained; and chlorine can be produced stably over a long time by oxidizing hydrogen chloride with oxygen by using the above-obtained supported ruthenium oxide as a catalyst.

DESCRIPTION OF EMBODIMENTS

Hereinafter, the present invention will be described in detail. In the process of the present invention for producing a supported ruthenium oxide in which ruthenium oxide and silica are supported on a titania carrier, a titania carrier is brought into contact with an alkoxysilane compound, followed by being dried under a stream of a water vapor-containing gas, then is subjected to a first calcination under an atmosphere of an oxidizing gas, followed by being brought into contact with a ruthenium compound, and then is subjected to a second calcination under an atmosphere of an oxidizing gas.

The titania carrier may comprise a rutile titania (titania having a rutile crystalline structure), an anatase titania (titania having an anatase crystalline structure), an amorphous titania or the like, or a mixture thereof. In the present invention, a titania carrier comprising a rutile titania and/or an anatase titania is preferably used. Above all, preferably used is a titania carrier comprising a rutile titania and/or an anatase titania wherein the ratio of the rutile titania to total of the rutile titania and the anatase titania in the titania carrier (hereinafter optionally referred to as a rutile titania ratio) is preferably 50% or more, more preferably 70% or more, still more preferably 90% or more. As the rutile type titania ratio becomes higher and higher, the thermal stability of the resultant supported ruthenium oxide tends to be more and more improved, and the catalytic activity becomes improved. The above-described rutile titania ratio can be measured by the X-ray diffraction method (hereinafter referred to as XRD method) and can be calculated by the following equation (1):

$$\text{Rutile type titania ratio}[\%]=[I_R/(I_A+I_R)]\times 100 \quad (1)$$

$I_R$: an intensity of a diffraction line indicating plane (110) of rutile type titania
$I_A$: an intensity of a diffraction line indicating plane (101) of anatase type titania The sodium content in the titania carrier is preferably 200 ppm by weight or less, and the calcium content the titania carrier is preferably 200 ppm by weight or less. In addition, the content of all the alkali metal elements in the titania carrier is more preferably 200 ppm by weight or less, and the content of all the alkali earth metal elements in the titania carrier is more preferably 200 ppm by weight or less. The contents of the alkali metal elements and the alkali earth metal elements can be measured, for example, by an inductively coupled high frequency plasma emission spectral analysis (hereinafter optionally referred to as ICP analysis), an atomic absorption analysis, an ion chromatographic analysis or the like, and the contents thereof are preferably measured by the ICP analysis. The titania carrier may contain an oxide such as alumina, zirconia or niobium oxide.

The specific surface area of the titania carrier can be measured by the nitrogen adsorption method (the BET method), and is usually measured by the BET single-point determination. The specific surface area of the titania carrier found by the measurement is usually from 5 to 300 $m^2/g$, preferably from 5 to 50 $m^2/g$. When a specific surface area of the titania carrier is too large, the titania carrier and the ruthenium oxide in the resultant supported ruthenium oxide are easily sintered, with the result that thermal stability of the resultant supported ruthenium oxide tends to lower. On the other hand, when a specific surface area of the titania carrier is too small, the ruthenium oxide in the resultant supported ruthenium oxide is hard to be dispersed, with the result that catalytic activity of the resultant supported ruthenium oxide tends to lower.

Supporting of silica on the titania carrier is performed by the process in which a titania carrier is brought into contact with an alkoxysilane compound, followed by being dried under a stream of a water vapor-containing gas, then is subjected to a first calcination under an atmosphere of an oxidizing gas. Examples of the alkoxysilane compound include a tetraalkoxysilane, an alkyl alkoxysilane, a phenyl alkoxysilane and a halogenated alkoxysilane, and among them, a tetraalkoxysilane is preferred. Examples of the tetraalkoxysilane include tetramethoxysilane, tetraethoxysilane, tetrapropoxysilane, tetraisopropoxysilane and tetrabutoxysilane, and among them, tetraethoxysilane is preferred. Examples of the alkyl alkoxysilane include methyltrimetoxysilane, dimethyldimethoxysilane and methyltriethoxysilane. Examples of the phenyl alkoxysilane include phenyltrimethoxysilane and phenyltriethoxysilane. Examples of the halogenated alkoxysilane include $SiCl(OR)_3$ (hereinafter R represents an alkyl group), $SiCl_2(OR)_2$, $SiCl_3(OR)$, and the like. As the alkoxysilane compound, a hydrate of the alkoxysilane compound may be used, and two or more selected from the above alkoxysilane compounds may be used. The amount of the alkoxysilane compound to be used is preferably from 0.0005 to 0.15 mol, preferably from 0.0010 to 0.10 mol, per one mole of titania. When two or more kinds of the silicon compounds are used, the total amount of the silicon compounds used may be adjusted to fall within the above-specified range based on the amount of titania.

The contact treatment of a titania carrier with an alkoxysilane compound is preferably carried out by subjecting a titaniacarrier to a contact treatment with a solution obtained by dissolving an alkoxysilane compound in an alcohol and/or water (hereinafter, the solution may be referred to as an alkoxysilane compound solution). Examples of an alcohol include methanol, ethanol, and the like. As the water, water with a high purity such as distilled water, ion-exchange water or super-pure water is preferably used. If the water to be used contains a lot of impurities, such impurities tend to adhere to the resultant catalyst, which may lead to a decrease in the catalytic activity thereof. In this contact treatment, a temperature for the treatment is usually from 0 to 100° C., preferably from 0 to 50° C.; and a pressure for the treatment is usually from 0.1 to 1 MPa, preferably an atmospheric pressure. This contact treatment may be carried out under an atmosphere of air or an inert gas such as nitrogen, helium, argon or carbon dioxide, which may contain water vapor.

As the contact treatment, an impregnation or immersion method may be employed. Examples of the method for the contact treatment of the titania carrier with the alkoxysilane compound solution include: (A) a method of impregnating the titania carrier with the alkoxysilane compound solution; and (B) a method of immersing the titania carrier in the alkoxysilane compound solution, while the former method (A) is preferable. An alkoxysilane compound is supported on the titania carrier by this contact treatment.

After a titania carrier is subjected to the contact treatment with an alkoxysilane compound, it is dried under a stream of a water vapor-containing gas. In the drying, the temperature therefor is preferably from 10° C. to 100° C., and the pressure therefor is preferably from 0.01 to 1 MPa, more preferably an atmospheric pressure. A concentration of water vapor in the water vapor-containing gas is defined in a range below the amount of saturated water vapor on the drying condition, and the concentration is preferably from 0.5 to 10% by volume, more preferably from 1.0 to 5% by volume. The concentration can be adjusted by being mixed with a gas, such as oxidizing gases such as air, and inert gases such as nitrogen, helium, argon, and carbon dioxide. As the water vapor-containing gas, a mixed gas of a water vapor and an inert gas is especially preferred. In the drying, a feeding rate of the water vapor-containing gas is preferably from 10 to 2000 per hour, more preferably from 100 to 1000 per hour, still more preferably from 100 to 500 per hour, under standard state (converted at 0° C. under 0.1 MPa), in terms of space velocity (GHSV) of the water vapor-containing gas in the titania carrier. In this respect, the space velocity can be obtained by dividing an amount per hour (L/h) of the water vapor-containing gas passing through the equipment in which a drying treatment is performed, by a volume (L) of the titania carrier in the equipment in which a drying treatment is performed.

It is preferred to carry out the drying preferably while mixing. The drying while mixing means that a titania carrier after the contact treatment with an alkoxysilane compound is dried not in a static state but in a fluidized state. Examples of the method for mixing include: a method of rotating a drying container itself, a method of shaking a drying container itself, a method of mixing with a mixer equipped in a drying container, and the like.

After the drying, a first calcination is carried out under an atmosphere of an oxidizing gas. The supported alkoxysilane compound is converted into silica by this calcination. Examples of the oxidizing gas include an oxygen containing gas. A concentration of oxygen in the gas is usually from about 1 to about 30% by volume. As an oxygen source therefor, an air or pure oxygen is usually used, which optionally may be diluted with an inert gas or a water vapor. An air is especially preferable as the oxidizing gas. A calcining temperature is usually from 100 to 1000° C., preferably from 250 to 450° C.

As mentioned above, silica is supported on a titania carrier, and subsequently, ruthenium oxide is supported thereon. The supporting of the ruthenium oxide on the titania carrier with silica supported thereon is performed by the process in which the titania carrier with silica supported thereon is brought into contact with a ruthenium compound, and then is subjected to a second calcination under an atmosphere of an oxidizing gas.

Examples of the ruthenium compound include halides such as $RuCl_3$ and $RuBr_3$; halogeno acid salts such as $K_3RuCl_6$ and $K_2RuCl_6$; oxo acid salts such as $K_2RuO_4$ and $Na_2RuO_4$; oxyhalides such as $Ru_2OCl_4$, $Ru_2OCl_5$ and $Ru_2OCl_6$; halogeno complexes such as $K_2[RuCl_5(H_2O)_4]$, $[RuCl_2(H_2O)_4]Cl$, $K_2[Ru_2OCl_{10}]$ and $Cs_2[Ru_2OCl_4]$; ammine complexes such as $[Ru(NH_3)_5H_2O]Cl_2$, $[Ru(NH_3)_5Cl]Cl_2$, $[Ru(NH_3)_6]Cl_2$, $[Ru(NH_3)_6]Cl_3$ and $[Ru(NH_3)_6]Br_3$; carbonyl complexes such as $Ru(CO)_5$ and $Ru_3(CO)_{12}$; carboxylate complexes such as $[Ru_3O(OCOCH_3)_6(H_2O)_3]OCOCH_3$ and $[Ru_2(OCOR^1)_4]Cl$ ($R^1$=a $C_{1-3}$ alkyl group); nitrosyl complexes such as $K_2[RuCl_5(NO)]$, $[Ru(NH_3)_5(NO)]Cl_3$, $[Ru(OH)(NH_3)_4(NO)](NO_3)_2$ and $[Ru(NO)](NO_3)_3$; phosphine complexes; amine complexes; acetylacetonato complexes; and the like. Among them, the halides are preferably used, and in particular, the chlorides are preferably used. As the ruthenium compound, a hydrate of the ruthenium compound optionally may be used, and two or more selected from the above ruthenium compounds may be used.

A ratio of the titania carrier with silica supported thereon to the ruthenium compound to be used may be appropriately selected so that a weight ratio of the ruthenium oxide/the titania carrier in the resultant supported ruthenium oxide obtained after the second calcination, as will be described later, will be preferably 0.1/99.9 to 20.0/80.0, more preferably 0.3/99.7 to 10.0/90.0, still more preferably 0.5/99.5 to 5.0/95.0. When the ratio of the ruthenium oxide is too small, the catalytic activity of the resultant supported ruthenium oxide is likely to be insufficient. When the ratio thereof is too large, it may be disadvantageous in view of cost-effectiveness. In addition, a ratio of the ruthenium compound to the titania carrier to be used is so selected that a content of the ruthenium oxide can be preferably from 0.10 to 20 mol, more preferably from 0.20 to 10 mol, per one mole of the silica supported on the titania carrier. When the number of moles of the ruthenium oxide per one mole of silica is too large, the thermal stability of the resultant supported ruthenium oxide may become lower. When it is too small, the catalytic activity of the resultant supported ruthenium oxide may be lower.

The contact treatment of a titania carrier with silica supported thereon with a ruthenium compound is preferably carried out by subjecting the titania carrier to a contact treatment with a solution containing the ruthenium compound and a solvent. Examples of the solvent in the contact treatment include water, an alcohol, nitrile and the like, and two or more selected from the solvents may be used. As the water, water with a high purity such as distilled water, ion-exchange water or super-pure water is preferably used. If the water to be used contains a lot of impurities, such impurities tend to adhere to the resultant catalyst, which may lead to a decrease in the catalytic activity thereof. Examples of the alcohol include alcohols having 1 to 6 carbon atoms, such as methanol, ethanol, n-propanol, isopropanol, hexanol, and cyclohexanol.

Examples of the nitrile include nitriles having 1 to 6 carbon atoms, such as acetonitrile, propionitrile, and benzonitrile. An amount of the solvent contained in the solution is preferably 70% by volume or more of the amount found by subtracting the volume of the ruthenium compound for use in the supporting, from the total pore volume of the titania carrier to be used. The upper limit of the amount of the solvent to be used is not particularly limited, but when the amount of the solvent to be used is too large, it tends to take time for the drying, and therefore the amount of the solvent is preferably about 120% by volume or less. In this contact treatment, a temperature for the treatment is usually from 0 to 100° C., preferably from 0 to 50° C.; and a pressure for the treatment is usually from 0.1 to 1 MPa, preferably an atmospheric pressure. This contact treatment may be carried out under an atmosphere of air or an inert gas such as nitrogen, helium, argon or oxygen dioxide, which may contain water vapor.

As the contact treatment, an impregnation or immersion method may be employed. Examples of the method for the contact treatment of the titania carrier with silica supported thereon with a solution containing the ruthenium compound and a solvent include: (C) a method of impregnating the titania carrier with silica supported thereon in the solution containing the ruthenium compound and a solvent; and (D) a method of immersing the titania carrier with silica supported thereon in the solution containing the ruthenium compound and a solvent, while the former method (C) is preferable. A ruthenium compound is supported on the titania carrier with silica supported thereon by this contact treatment.

After the contact treatment of the titania carrier with silica supported thereon with a ruthenium compound, a second calcination is carried out under an atmosphere of an oxidizing gas. The ruthenium compound supported on the titania carrier is converted into a ruthenium oxide by this calcination. The oxidizing gas is a gas containing an oxidizing substance, for example, an oxygen-containing gas. A concentration of oxygen in the gas is usually from about 1 to about 30% by volume. As an oxygen source therefor, an air or pure oxygen is usually used, which optionally may be diluted with an inert gas or a water vapor. An air is especially preferable as the oxidizing gas. A calcining temperature is usually from 100 to 500° C., preferably from 200 to 400° C.

After a ruthenium compound is supported on the titania carrier with silica supported thereon, the second calcination may be performed under the atmosphere of an oxidizing gas after performing a reduction treatment; the second calcination may be performed under the atmosphere of an oxidizing gas after performing a drying; or the calcination may be performed under the atmosphere of an oxidizing gas after performing a reduction treatment and a drying. This drying method may be a known method, wherein a temperature for the drying is usually from room temperature to about 100° C., and a pressure therefor, usually from 0.001 to 1 MPa, preferably an atmospheric pressure. Such drying may be carried out under an atmosphere of an air or an inert gas such as nitrogen, helium, argon or carbon dioxide, which may contain a water vapor. Examples of this reduction treatment include the reduction treatment described, for example in JP 2000-229239 A, JP 2000-254502 A, JP 2000-281314 A, JP 2002-79093 A.

By performing the second calcination under the atmosphere of an oxidizing gas after a ruthenium compound is supported on the titania carrier with silica supported thereon, a supported ruthenium oxide in which ruthenium oxide and silica are supported on a titania carrier can be produced. The oxidation number of ruthenium in the ruthenium oxide-supported material is usually +4, and the ruthenium oxide is usually ruthenium dioxide ($RuO_2$), and may contain ruthenium of other oxidation number or ruthenium oxide in other form.

A content of silica in the supported ruthenium oxide obtained according to the production process of the present invention is preferably from 0.01 to 10% by weight, more preferably from 0.1 to 5% by weight, which however varies depending on the physical properties of the titania or a content of ruthenium oxide in the resultant supported ruthenium oxide.

The supported ruthenium oxide obtained according to the production process of the present invention is used preferably as molded articles. The molded article may have, for example, a spherical shape, a cylindrical shape, a pellet-like shape, a shape formed by extrusion, a ring shape, a honeycomb shape, or a granular shape of a suitable size obtained by fracture and classification after molding, and among them, the molded article preferably has a pellet-like shape. Thereupon, the molded article preferably has a diameter of 5 mm or less. When the diameter of the molded article is too large, conversion of an oxidizing reaction may be lowered when the molded article is used as an oxidizing reaction catalyst. The lower limit of the diameter of the molded article is not particularly limited, but when the lower limit becomes excessively small, a pressure loss at a catalyst layer becomes increased, and therefore a molded article having a diameter of 0.5 mm or more is usually used. The diameter of the molded article referred herein means the diameter of a sphere in the case of a spherical shape, the diameter of a circular cross section in the case of a cylindrical shape, or the maximum diameter of a cross section in the case of other shapes.

The molding step may be carried out when a titania carrier is prepared, after silica is supported on a titania carrier, or after ruthenium oxide and silica are supported on a titania carrier. The molding step is preferably carried out when a titania carrier is prepared or after silica is supported on a titania carrier. The molding step is more preferably carried out when a titania carrier is prepared. In the case where the molding step is carried out when a titania carrier is prepared, a known method may be applied, and for example, the titania in the form of powder or a sol may be kneaded, formed and then heat-treated to be used as the molded article of the titania carrier. Specifically, the molded article may be prepared as follows: titania powder or titania sol is kneaded with water and a processing aid such as an organic binder, and the knead mixture is extruded as a noodle-like strand, which is then dried and crushed to obtain formed solids, and the formed solids are heat-treated under an atmosphere of an oxidizing gas such as an air. Herein, the oxidizing gas means a gas which contains an oxidizing substance, e.g., an oxygen-containing gas or the like, of which an oxygen concentration is usually from about 1 to about 30% by volume. As an oxygen source therefor, an air or pure oxygen is usually used, which optionally may be diluted with an inert gas or a water vapor. An air is especially preferable as the oxidizing gas. Examples of the inert gas include nitrogen, helium, argon, carbon dioxide. Such an inert gas may be optionally diluted with water vapor. The use of nitrogen or carbon dioxide as the inert gas is particularly preferable. A temperature for the above-described heat treatment, if carried out, is usually from 400 to 1,000° C., preferably from 500 to 800° C.

The molded article has a pore volume of preferably from 0.15 to 0.40 mL/g, and more preferably from 0.15 to 0.30 mL/g. The pore volume of the molded article can be adjusted by controlling the composition of raw materials for use in the forming, and the temperature at which the molded article is heat-treated. The pore volume of the molded article can be measured by mercury intrusion technique, for example.

The supported ruthenium oxide thus produced is used as a catalyst, and chlorine can be efficiently produced by oxidizing hydrogen chloride with oxygen in the presence of this catalyst. As a reaction system, a reaction system such as a fluidized bed, a fixed bed, or a moving bed can be adopted, and a fixed bed reactor of adiabatic system or heat exchange system is preferable. When the fixed bed reactor of adiabatic system is used, any of a single-tube fixed bed reactor and a multi-tubular fixed bed reactor can be used, and a single-tube fixed bed reactor can be preferably used. When the fixed bed reactor of heat exchange system is used, any of a single-tube fixed bed reactor and a multi-tubular fixed bed reactor can be used, and a multi-tubular fixed bed reactor can be preferably used.

This oxidization reaction is an equilibrium reaction, which is preferably carried out at a relatively low temperature, since the oxidization reaction at an excessively high temperature decreases an equilibrium conversion. The reaction temperature is usually from 100 to 500° C., preferably from 200 to 450° C. The reaction pressure is usually from about 0.1 to about 5 MPa. As the oxygen source, either an air or pure oxygen may be used. The theoretical molar amount of oxygen relative to hydrogen chloride is ¼ mole. However, in general, oxygen in an amount 0.1 to 10 times larger than this theoretical amount is used. A rate of feeding hydrogen chloride is usually from about 10 to about 20,000 $h^{-1}$, in terms of a gas-feeding rate per one L of a catalyst (L/h; converted at 0° C. under 0.1 MPa), i.e., in terms of GHSV.

Having described the preferred modes of the present invention, the scope of the present invention is not limited to the details of those modes in any way.

EXAMPLES

While Examples of the present invention will be described below, the scope of the present invention is not limited to the details of Examples in any way.

Example 1

Preparation of Titania Carrier

Titania powder [F-1R manufactured by Showa Titanium Co., Ltd.; and a rutile type titania ratio=93%] (100 parts by weight) was mixed with an organic binder (YB-152A manufactured by YUKEN INDUSTRY CO., LTD.] (2 parts by weight); and the mixture was then admixed and kneaded with pure water (29 parts by weight) and titania sol [CSB manufactured by Sakai Chemical Industry Co., Ltd.; and a titania content=40% by weight] (12.5 parts by weight). This mixture was extruded into a noodle having a diameter of 3.0 mmφ, dried at 60° C. for 2 hours, and crushed into a length of around 3 to 5 mm. The molded articles were heated from room temperature to 600° C. in air over 1.7 hours and were then maintained at the same temperature for 3 hours for calcination thereof. Thus, there were obtained molded articles of white titania [a rutile type titania ratio=90% or more].

(Supporting of Silica on Titania Carrier)

To a 200 mL eggplant flask, 50.0 g (a volume of 38 mL) among the above obtained titania carrier is added, and the flask was placed on a rotary treater. The titania carrier was impregnated with a solution prepared by dissolving 1.77 g of tetraethoxysilane [manufactured by Wako Pure Chemical Industries, Ltd.; $Si(OC_2H_3)_4$] in 7.10 g of ethanol by dropwise adding over 20 minutes the solution into the eggplant flask containing the titania carrier supplied, while rotating the eggplant flask at 80 rpm with the eggplant flask being leaned by 60 degrees from a vertical direction. Subsequently, the temperature in the eggplant flask was adjusted to 30° C., while mixing the titania carrier by rotating at 80 rpm the eggplant flask containing the titania carrier after impregnation, and the titania carrier after impregnation was dried by continuously supplying and streaming a mixed gas of water vapor and nitrogen (a water vapor concentration: 4.0% by volume) in the eggplant flask at a flow rate of 231 mL/min. (converted at 0° C. under 0.1 MPa). The ratio (GHSV) of a rate of supplying the mixed gas to the volume of the titania carrier was 365/h (converted at 0° C. under 0.1 MPa). The resultant dried solids (53.0 g) were heated from room temperature to 300° C. in an air stream over 1.2 hours and were then maintained at the same temperature for 2 hours for calcination thereof. Thus, 50.0 g of a titania carrier with silica supported thereon (a silica-supporting titania carrier) was obtained. The resultant silica-supporting titania carrier was subjected to ICP analysis by using an ICP emission analyzer (IRIS Advantage manufactured by Nippon Jarrel-Ash Co., Ltd.) to find the silica content of 1.05% by weight (a silicon content: 0.49% by weight). A silica immobilization rate was calculated by the following equation from the analytical value obtained by ICP analysis, and the results are shown in Table 1.

Silica immobilization rate(%)=[ICP analytical value of silicon content in silica-supporting titania carrier(% by weight)]/[(amount of tetraethoxysilane used (g))×(molecular weight of silicon)/(molecular weight of tetraethoxysilane)/(amount of titania carrier used (g))]

(Production of Supported Ruthenium Oxide)

The silica-supporting titania carrier (10.0 g), thus obtained, was impregnated with an aqueous solution of a hydrate of ruthenium chloride [$RuCl_3 \cdot nH_2O$ having a Ru content of 40.0% by weight, manufactured by N.E. CHEMCAT CORPORATION] (0.24 g) in pure water (2.2 g) and were then dried at 25° C. under an atmosphere of air for 15 hours, to obtain solids (10.4 g). The solids (10.4 g) were heated from room temperature to 280° C. over 1.2 hours under a stream of air and were then maintained at the same temperature for 2 hours for calcination thereof. Thus, bluish grey supported ruthenium oxide (10.1 g) having a silica content of 1.05% by weight was obtained.

(Evaluation of Initial Activity of Supported Ruthenium Oxide)

The supported ruthenium oxide (1.0 g) thus obtained was diluted with α-alumina balls with diameters of 2 mm [SSA995 manufactured by NIKKATO CORPORATION] (12 g), and the diluted supported ruthenium oxide was charged in a nickel-made reaction tube (with an inner diameter of 14 mm). α-Alumina balls (12 g) of the same kind as above for use as a pre-heating layer was further charged in the gas inlet side of the reaction tube. A hydrogen chloride gas and an oxygen gas were fed into the reaction tube at rates of 0.214 mol/hr. (converted into 4.8 L/hr. at 0° C. under 0.1 MPa) and 0.107 mol/hr. (converted into 2.4 L/hr. at 0° C. under 0.1 MPa) under a normal pressure, respectively. Then, the catalyst layer was heated to a temperature of from 282 to 283° C. to carry out the reaction. At a point of time when 1.5 hours had passed since the start of the reaction, the gas from the outlet of the reaction tube was allowed to flow into an aqueous 30% potassium iodide solution for sampling for 20 minutes. Then, the amount of produced chlorine was measured by the iodometric titration method to determine a chlorine-producing rate (mol/h). A conversion of hydrogen chloride was calculated by the following equation, from this chlorine-production rate and the above-described hydrogen chloride-feeding rate. The results are shown in Table 1.

Conversion of hydrogen chloride(%)=[chlorine-production rate(mol/hr.)×2/hydrogen chloride-feeding rate(mol/hr.)]×100

(Thermal Stability Test of Supported Ruthenium Oxide)

The ruthenium oxide-supported material (1.2 g) thus obtained was charged in a quartz-made reaction tube (with an inner diameter of 21 mm). A hydrogen chloride gas, an oxygen gas, a chlorine gas and water vapor were fed into the reaction tube at rates of 0.086 mol/hr. (converted into 1.9 L/hr. at 0° C. under 0.1 MPa), 0.075 mol/hr. (converted into 1.7 L/hr. at 0° C. under 0.1 MPa), 0.064 mol/hr. (converted into 1.4 L/hr. at 0° C. under 0.1 MPa) and 0.064 mol/hr. (converted into 1.4 L/hr. at 0° C. under 0.1 MPa), under a normal pressure, respectively. Then, the catalyst layer was heated to a temperature of from 435 to 440° C. to carry out the reaction. At a point of time when 50 hours had passed since the initiation of the reaction, the reaction was stopped, and the reactor was cooled while a nitrogen gas was being fed at a rate of 0.214 mol/hr. (converted into 4.8 L/hr. at 0° C. under 0.1 MPa).

(Evaluation of Activity of Supported Ruthenium Oxide after Thermal Stability Test)

Out of 1.2 g of the supported ruthenium oxide subjected to the above-described thermal stability test, 1.0 g of the same was taken and was used to determine a conversion of hydrogen chloride by the same method as in the above-described evaluation of initial activity. The result is shown in Table 1.

Example 2

Preparation of Titania Carrier

A white titania carrier was obtained according to the same operation as in Example 1 (Preparation of Titania Carrier).

(Supporting of Silica on Titania Carrier)

The resultant silica-supporting titania carrier was subjected to ICP analysis by using an ICP emission analyzer (IRIS Advantage manufactured by Nippon Jarrel-Ash Co., Ltd.) to find the silica content of 0.90% by weight (a silicon content: 0.42% by weight). A silica immobilization rate was calculated as in Example 1 from this analytical value of silicon content, and the results are shown in Table 1.

(Production of Supported Ruthenium Oxide)

The same operation as that of Example 1 (Production of Supported Ruthenium Oxide) was performed, except that the resultant silica-supporting titania carrier was used, and thus bluish grey supported ruthenium oxide (10.1 g) having a ruthenium oxide content of 1.25% by weight and a silica content of 0.90% by weight was obtained.

(Initial Activity Evaluation, Thermal Stability Test, and Activity Evaluation after Thermal Stability Test on Supported Ruthenium Oxide)

An initial activity evaluation, a thermal stability test and an activity evaluation after the thermal stability test were conducted on the resultant supported ruthenium oxide in the same manners as in Example 1.

Example 3

Preparation of Titania Carrier

A white titania carrier was obtained according to the same operation as in Example 1 (Preparation of Titania Carrier).

(Supporting of Silica on Titania Carrier)

The same operation as that of Example 1 (Supporting of Silica on Titania Carrier) was performed, except that the amount of tetraethoxysilane used was 1.60 g, the amount of ethanol used was 7.25 g and the mixed gas with a water vapor concentration of 3.0% by volume was allowed to stream for 5 hours, and thus the silica-supporting titania carrier (49.8 g) was obtained. The resultant silica-supporting titania carrier was subjected to ICP analysis by using an ICP emission analyzer (IRIS Advantage manufactured by Nippon Jarrel-Ash Co., Ltd.) to find the silica content of 0.83% by weight (a silicon content: 0.39% by weight). A silica immobilization rate was calculated as in Example 1 from this analytical value of silicon content, and the results are shown in Table 1.

(Production of Supported Ruthenium Oxide)

The same operation as that of Example 1 (Production of Supported Ruthenium Oxide) was performed, except that the resultant silica-supporting titania carrier was used, and thus bluish grey supported ruthenium oxide (10.1 g) having a ruthenium oxide content of 1.25% by weight and a silica content of 0.83% by weight was obtained.

(Initial Activity Evaluation, Thermal Stability Test, and Activity Evaluation after Thermal Stability Test on Supported Ruthenium Oxide)

An initial activity evaluation, a thermal stability test and an activity evaluation after the thermal stability test were conducted on the resultant supported ruthenium oxide in the same manners as in Example 1.

Example 4

Preparation of Titania Carrier

A white titania carrier was obtained according to the same operation as in Example 1 (Preparation of Titania Carrier).

(Supporting of Silica on Titania Carrier)

The same operation as that of Example 1 (Supporting of Silica on Titania Carrier) was performed, except that the amount of tetraethoxysilane used was 1.24 g, and the amount of ethanol used was 7.55 g, and thus silica-supporting titania carrier (49.8 g) was obtained. The resultant silica-supporting titania carrier was subjected to ICP analysis by using an ICP emission analyzer (IRIS Advantage manufactured by Nippon Jarrel-Ash Co., Ltd.) to find the silica content of 0.79% by weight (a silicon content: 0.37% by weight). A silica immobilization rate was calculated as in Example 1 from this analytical value of silicon content, and the results are shown in Table 1.

(Production of Supported Ruthenium Oxide)

The same operation as that of Example 1 (Production of Supported Ruthenium Oxide) was performed, except that the resultant silica-supporting titania carrier was used, and thus bluish grey supported ruthenium oxide (10.1 g) having a ruthenium oxide content of 1.25% by weight and a silica content of 0.79% by weight was obtained.

(Initial Activity Evaluation, Thermal Stability Test, and Activity Evaluation after Thermal Stability Test on Supported Ruthenium Oxide)

An initial activity evaluation, a thermal stability test and an activity evaluation after the thermal stability test were conducted on the resultant supported ruthenium oxide in the same manners as in Example 1.

Comparative Example 1

Preparation of Titania Carrier

A white titania carrier was obtained according to the same operation as in Example 1 (Preparation of Titania Carrier).

(Supporting of Silica on Titania Carrier)

The same operation as that of Example 1 (Supporting of Silica on Titania Carrier) was performed, except that a nitrogen gas (a water vapor concentration: 0% by volume) was used in place of the mixed gas of water vapor and nitrogen, and thus the silica-supporting titania carrier (50.1 g) was obtained. The resultant silica-supporting titania carrier was subjected to ICP analysis by using an ICP emission analyzer (IRIS Advantage manufactured by Nippon Jarrel-Ash Co., Ltd.) to find the silica content of 0.49% by weight (a silicon content: 0.23% by weight). A silica immobilization rate was calculated as in Example 1 from this analytical value of silicon content, and the results are shown in Table 1.

(Production of Supported Ruthenium Oxide)

The same operation as that of Example 1 (Production of Supported Ruthenium Oxide) was performed, except that the resultant silica-supporting titania carrier was used, and thus bluish grey supported ruthenium oxide (10.0 g) having a ruthenium oxide content of 1.25% by weight and a silica content of 0.49% by weight was obtained.

(Initial Activity Evaluation, Thermal Stability Test, and Activity Evaluation after Thermal Stability Test on Supported Ruthenium Oxide)

An initial activity evaluation, a thermal stability test and an activity evaluation after the thermal stability test were conducted on the resultant supported ruthenium oxide in the same manners as in Example 1.

Comparative Example 2

Preparation of Titania Carrier

A white titania carrier was obtained according to the same operation as in Example 1 (Preparation of Titania Carrier).

(Supporting of Silica on Titania Carrier)

The amount (20.0 g) out of the resultant titania carrier was impregnated with a solution of tetraethoxysilane [Si(OC$_2$H$_5$)$_4$ manufactured by Wako Pure Chemical Industries, Ltd.] (0.71 g) in ethanol (3.1 g) and was then dried at 24° C. for 15 hours under an atmosphere of air. The resultant dried solids (20.2 g) were heated from room temperature to 300° C. in an air stream over 1.2 hours and were then maintained at the same temperature for 2 hours for calcination thereof. Thus, 20.1 g of a titania carrier with silica supported thereon (a silica-supporting titania carrier) was obtained. The resultant silica-supporting titania carrier was subjected to ICP analysis by using an ICP emission analyzer (IRIS Advantage manufactured by Nippon Jarrel-Ash Co., Ltd.) to find the silica content of 0.64% by weight (a silicon content: 0.30% by weight). A silica immobilization rate was calculated as in Example 1 from this analytical value of silicon content, and the results are shown in Table 1.

(Production of Supported Ruthenium Oxide)

The same operation as that of Example 1 (Production of Supported Ruthenium Oxide) was performed, except that the resultant silica-supporting titania carrier was used, and thus bluish grey supported ruthenium oxide (10.1 g) having a ruthenium oxide content of 1.25% by weight and a silica content of 0.64% by weight was obtained.

(Initial Activity Evaluation, Thermal Stability Test, and Activity Evaluation after Thermal Stability Test on Supported Ruthenium Oxide)

An initial activity evaluation, a thermal stability test and an activity evaluation after the thermal stability test were conducted on the resultant supported ruthenium oxide in the same manners as in Example 1.

TABLE 1

|  |  | EX 1 | EX 2 | EX 3 | EX 4 | C. EX5 | C. EX2 |
|---|---|---|---|---|---|---|---|
| Silica-supporting titania carrier | Water vapor concentration [vol. %] | 4.0 | 2.0 | 3.0 | 3.0 | 0 | — |
|  | Silica content [wt. %] | 1.05 | 0.90 | 0.83 | 0.79 | 0.49 | 0.64 |
|  | Silica immobilization rate [%] | 103 | 88 | 90 | 111 | 48 | 63 |
| Supported ruthenium oxide | Ruthenium oxide content [wt. %] | 1.25 | 1.25 | 1.25 | 1.25 | 1.25 | 1.25 |
| Result of reaction | Conversion [%] of hydrogen chloride Initial: A | 6.3 | 6.4 | 7.3 | 7.7 | 8.0 | 8.3 |
|  | Conversion [%] of hydrogen chloride After thermal stability test: B | 5.7 | 5.6 | 6.4 | 6.1 | 5.7 | 5.8 |
|  | B/A | 0.90 | 0.88 | 0.88 | 0.79 | 0.71 | 0.70 |

As shown in Table 1, in Examples 1-4, it is found that the silica-supporting titania carrier having a high silica immobilization rate was obtained by impregnating the titania carrier with tetraethoxysilane and then drying the titania carrier under a stream of a water vapor-containing gas in the preparation of the silica-supporting titania carrier, and that silica can be efficiently supported on a titania carrier. It is also found that conversions of hydrogen chloride were maintained before and after the thermal stability test by using as a catalyst the supported ruthenium oxide produced using such a silica-supporting titania carrier, and that a supported ruthenium oxide superior in thermal stability and catalyst lifetime is obtained and chlorine can be produced stably over a long time.

On the other hand, in Comparative Example 1 in which the silica-supporting titania carrier was prepared by performing drying under a stream of a nitrogen gas which does not contain water vapor, and Comparative Example 2 in which the silica-supporting titania carrier was prepared by performing drying under an atmosphere of air without a stream of a water vapor-containing gas, the silica-supporting titania carrier had a low silica immobilization rate and conversions of hydrogen chloride were not maintained before and after the thermal stability test, which means a large declining rate in a conversion of hydrogen chloride, when compared to those of Examples 1-4.

The invention claimed is:

1. A process for producing a supported ruthenium oxide in which ruthenium oxide and silica are supported on a titania carrier, wherein a titania carrier is brought into contact with an alkoxysilane compound, followed by being dried under a stream of a water vapor-containing gas, then is subjected to a first calcination under an atmosphere of an oxidizing gas, followed by being brought into contact with a ruthenium compound, and then is subjected to a second calcination under an atmosphere of an oxidizing gas,
   wherein, in the drying, a space velocity of the water vapor-containing gas for the titania carrier is 10-2000/h in the standard state.

2. The process of claim 1, wherein a water vapor concentration in the water vapor-containing gas is 0.5 to 10% by volume.

3. The process of claim 1, wherein a ratio of rutile type titania in the titania carrier to total of the rutile type titania and anatase type titania is 50% or more, when measured by the X-ray diffraction method.

4. The process of claim 1, wherein the alkoxysilane compound is a tetraalkoxysilane.

5. The process of claim 4, wherein the tetraalkoxysilane is tetraethoxysilane.

6. A process for producing chlorine, wherein hydrogen chloride is oxidized with oxygen in the presence of a supported ruthenium oxide produced by the process defined in claim 1.

7. The process of claim 2, wherein a ratio of rutile type titania in the titania carrier to total of the rutile type titania and anatase type titania is 50% or more, when measured by the X-ray diffraction method.

8. The process of claim 2, wherein the alkoxysilane compound is a tetraalkoxysilane.

9. A process for producing chlorine, wherein hydrogen chloride is oxidized with oxygen in the presence of a supported ruthenium oxide produced by the process defined in claim 2.

* * * * *